United States Patent
Togawa et al.

[11] Patent Number: 5,925,435
[45] Date of Patent: *Jul. 20, 1999

[54] IMPACT ENERGY ABSORPTIVE STRUCTURES

[75] Inventors: Yoshiaki Togawa, Ichihara; Masahito Matsumoto, Ibaraki; Makoto Nagata; Toru Yabe, both of Ichihara, all of Japan

[73] Assignee: Sumitomo Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/538,849

[22] Filed: Oct. 4, 1995

[30] Foreign Application Priority Data

Oct. 4, 1994 [JP] Japan .................................. 6-264647
Dec. 22, 1994 [JP] Japan .................................. 6-336020

[51] Int. Cl.$^6$ ........................................ F16F 7/12
[52] U.S. Cl. ................. 428/120; 280/748; 280/751; 280/752; 296/146.1; 296/146.6; 296/146.7; 296/153; 428/119; 428/163; 428/166; 428/167
[58] Field of Search ................. 428/119, 120, 428/163, 166, 167; 280/751, 748, 752; 296/146.1, 146.6, 146.7, 153

[56] References Cited

U.S. PATENT DOCUMENTS

| | | | |
|---|---|---|---|
| 3,926,463 | 12/1975 | Landwehr et al. | 293/63 |
| 4,029,350 | 6/1977 | Goupy et al. | 293/71 |
| 4,050,726 | 9/1977 | Hablitzel | 293/71 |
| 4,272,103 | 6/1981 | Schmid et al. | 280/751 |
| 5,069,318 | 12/1991 | Kulesha et al. | 188/377 |
| 5,326,130 | 7/1994 | Gedeon et al. | 280/752 |
| 5,431,442 | 7/1995 | Tomita et al. | 280/752 |
| 5,433,478 | 7/1995 | Naruse | 280/751 |
| 5,494,725 | 2/1996 | Fejes | 428/120 |
| 5,636,866 | 6/1997 | Suzuki et al. | 280/748 |

FOREIGN PATENT DOCUMENTS

| | | |
|---|---|---|
| A0705994 | 4/1996 | European Pat. Off. . |
| A-2149827 | 3/1973 | France . |
| A-2277277 | 1/1976 | France . |
| A-2698932 | 6/1994 | France . |
| A4401865 | 8/1994 | Germany . |
| A19505935 | 8/1995 | Germany . |
| 53-45838 | 11/1978 | Japan .................................. 428/120 |
| A-57195938 | 1/1982 | Japan . |
| 3-13251 | 2/1991 | Japan . |
| 3-49110 | 5/1991 | Japan . |
| 3-49111 | 5/1991 | Japan . |
| 4-128912 | 11/1992 | Japan . |
| 5-410 | 1/1993 | Japan . |
| 6-72153 | 3/1994 | Japan . |
| 06-270678 | 9/1994 | Japan . |
| WO-A8909349 | 10/1989 | WIPO . |

OTHER PUBLICATIONS

Automotive Engineering, vol. 101, No. 5, May 1, 1993, pp. 43–47, "Ductile Thermoplastic Impact Structures".

*Primary Examiner*—Nasser Ahmad
*Attorney, Agent, or Firm*—Sughrue, Mion, Zinn, Macpeak & Seas, PLLC

[57] ABSTRACT

An impact energy absorptive structure is made of usual plastic materials suitable for molding processing, and is designed to suit different degrees of impact loading anticipated in various applications. The impact energy absorptive structure is composed of a base member 11 and protruding rib members including long and short members, in which the proportion of the cross sectional area of the long rib members is between 0.3 to 0.8 of the total cross sectional area of the rib members. Other design modifications can be made readily to customize the impact resistance of the impact energy absorptive structures.

28 Claims, 6 Drawing Sheets

IMPACT ENERGY ABSORPTIVE STRUCTURES

FIELD OF THE INVENTION

The present invention relates in general to internally mounted impact energy absorptive structures, such as for protecting automobile passengers when an impact loading is given from the outside, and relates in particular to an impact absorptive internal structures having controllable impact absorptive characteristics.

BACKGROUND OF THE INVENTION

Impact absorbing structures are disclosed in, for example, Japanese Patent Application, Second Publication, H5-410, Japanese Utility Model Application, First Publication, H3-13251, Japanese Patent Application, First Publication, H3-49110 and Japanese Patent Application, First Publication, H3-49111, which are based on styrene or urethane foams disposed at certain strategic locations within a passenger automobile.

The type of construction used in these conventional impact absorbing structures is based on encasing impact absorbing members in plastic parts. Because of such dual structures, the final cost of the impact absorbing structures is high, and their assembly steps are also increased.

An approach to remedy such a problem is disclosed in documents such as Japanese Patent Application, First Publication, H4-128912, and Japanese Patent Application, First Publication, H6-72153 which disclose a structure in which plastic rib members themselves act as impact absorbing structural members.

However, the characteristics required for impact absorbing members should be different for different applications, and these publications do not disclose any specific designs for the rib structures to judge whether the impact absorbing structures can be customized to suit the conditions encountered in their applications.

SUMMARY AND DETAILED DESCRIPTION OF THE INVENTION

It is an object of the present invention to provide an impact energy absorptive structures whose impact resistance properties can be customized to the requirements of an application by providing a designing concept of specially shaped rib members.

Another object of the present invention is to provide an impact energy absorptive structures having designs applicable to the application which can be manufactured by using conventional plastic materials.

This object is achieved in an impact energy absorptive structures comprising: a plurality of long rib members and short rib members for absorbing impact energy, protruding from a base member in a direction of impact loading; wherein a proportion of a cross sectional area of the long rib members is in a range between 0.3 to 0.8 of a total cross sectional area of all rib members at a plane orthogonally intersecting the direction of impact loading.

According to the impact energy absorptive structures presented above, because the rib members are made of long and short members, in the initial impact loading stage, the long rib members begin to collapse first before the impact loading contacts the short rib members. This design prevents a high initial peak of impact load during the initial contact of the impact loading with the energy absorbing member. By adjusting the initial impact loading cross sectional area of the long rib members to 0.3 to 0.8 of the total cross sectional area of the rib members, the initial peak of impact load may be lowered to the average load during the deformation of the impact energy absorptive structures. The interior members to be protected from extensive shocks therefore can be made to experience varying degree of subsequent moderate impact.

Another impact energy absorptive structure can be made by rib members having a constant width, and arranged in a uniform pattern as well as protruding from a base member, but the rib members are provided with a cut-out section so as to leave a cross sectional area of the members appropriate with anticipated impact loading. By choosing a proper size of the cut-out section, the impact energy to be absorbed can be suitably adjusted while maintaining the uniformity of loading on the base member itself. The regularly arranged rib member having a constant width is made to facilitate easy manufacturing to suit the application. The capacity of the impact absorptivity can thus be adjusted to suit the application.

A modification of the impact energy absorptive structures above-mentioned can be made by providing cut-out sections to be formed in accordance with a design on a plane parallel to a direction of impact loading.

In this case, the strength of a portion near the cut-out sections formed on the plane parallel to the direction of impact loading is intentionally weakened, therefore, when the impact loading is uniformly given, deformation of said portion is greater than that of the other portion.

In one embodiment, the cut-out section is provided by removing intersections of lattice points formed by the ribs, thereby enabling absorption of a large amount of impact energy with minimum creation of the cut-out sections.

In one embodiment, the cross sectional area of said rib members varies in a designed pattern along the direction of impact loading.

The designed pattern mentioned above is such that cross sectional area of the rib members increases from a tip portion of the rib members towards a base member of the impact absorptive structures. This structure has an effect that low impact loads are absorbed at the tip of the rib members while high impact loads are absorbed by collapsing the structures close to the base member.

The width of the rib members can be arranged to increase from the tip portion to the base member, to facilitate removal of the manufactured structures from the mold.

Another aspect of the impact energy absorptive structures is that a constant cross sectional area may be utilized in a direction of impact loading, thereby providing a relatively constant resisting force of the collapsing impact energy absorptive structures.

The rib members may be shaped so that the thickness of the rib member decreases from a base member towards a tip portion of the rib members and is provided with a cut-out section having a width which increases from the tip portion of the rib members towards the base member. This type of construction facilitates mold making while providing constant resistance of the collapsing impact energy absorptive structures.

A modification of the impact energy absorptive structures above-mentioned is such that a width of the rib members increases from a tip portion of the rib members towards a base member, which would provide increasing resistance of the collapsing impact energy absorptive structures.

Another modification of the impact energy absorptive structures provides a base member: and a plurality of intersecting rib members for absorbing impact energy by deformation of the rib members which is made of a resin integral with the base member and protruding from the base member in a uniform arrangement in a direction of impact loading, wherein a cut-out section is provided to a designed location of the rib members so as to adjust impact absorptive characteristics of the impact energy absorptive structures. By providing properly chosen cut-out sections within the energy absorbing member, it is possible to customize the resistance properties of the collapsing impact energy absorptive structures.

In one embodiment, of the impact energy absorptive structures have the cut-out section formed in accordance with a design on a plane parallel to a direction of impact loading.

The cut-out section may be provided by removing intersections of lattice points formed by said rib members.

The cut-out section may be formed in a direction of impact loading.

The cut-out section may be provided with a cross sectional area which vary in a designed pattern along a direction of impact loading.

The designed pattern may be designed so that the cross sectional area of the intersecting rib members increases from a tip portion of said rib members towards the base member.

In one embodiment of the impact energy absorptive structures above-mentioned a width of the rib members increases from the tip portion towards the base member.

In one embodiment of the impact energy absorptive structures above-mentioned the designed pattern is a constant cross sectional area in a direction of impact loading.

In another embodiment of the impact energy absorptive structures as represented in the basic structure and all its modifications, the cross sectional area of the rib members can be chosen to suit an anticipated impact load absorbed by the impact energy absorptive structures.

The material for making the impact energy absorptive structures of the present invention is preferably a thermoplastic resin. The material may be chosen from thermoplastic resins such as polyethylene, polypropylene, polyvinylchloride, nylon, polycarbonate, polyethylene-telephthalate, PMMA ABS resins and their modifiers, polymer alloy or their mixtures. Among these, polyolefin resins such as homopolymers of ethylene and/or propylene, or copolymers of them with other copolymerizable components such as alpha-olefin are preferred, and polypropylene resins are even more preferable.

Especially preferable is a thermoplastic resin composition comprising components (A) aid (B) as defined next. The component (A) is an ethylene-propylene block copolymer containing 10 to 30% by weight of an ethylene-propylene copolymer portion having ethylene content of 20 to 60% by weight, preferably 30 to 50% by weight. The component (B) is either an ethylene-propylene copolymer rubber or an ethylene-butene-1 copolymer rubber. In said thermoplastic resin composition of components (A) and (B), the amount of (A) may range between 80 to 100% by weight and the corresponding remaining amount of (B) may range between 20 to 0% by weight. The total amount of the component (B) and the ethylene-propylene copolymer portion in the component (A) is 15 to 40% by weight, per 100% by weight of the sum of the components (A) and (B). The melt index (MI) of said thermoplastic resin composition of components (A) and (13) is 5–50 g/10min., preferably 10–35 g/10min.

Such a thermoplastic resin or thermoplastic resin composition may contain fillers, such as talc, mica and glass fiber, and conventional additives, such as antioxidants, UV absorbers, anti-flammable agents and coloring agents, as needed.

BRIEF DESCRIPTION OF THE DRAWINGS

The PE1 to PE8 and CM1 to CM2 are shown in Tables 1 and 2.

DESCRIPTION OF THE PREFERRED EMBODIMENTS

Preferred embodiments of the impact energy absorptive structures are presented below with reference to the drawings.

Embodiments 1 to 5 were developed based on a first series of experiments. In the drawings for the following embodiments, the structure of the impact energy absorptive structures is presented schematically and the thickness of the various structures is not shown in the drawings. In all cases, impact loading is applied vertically and the top of the structures is the first point of contact with an impact load.

Figure 1:
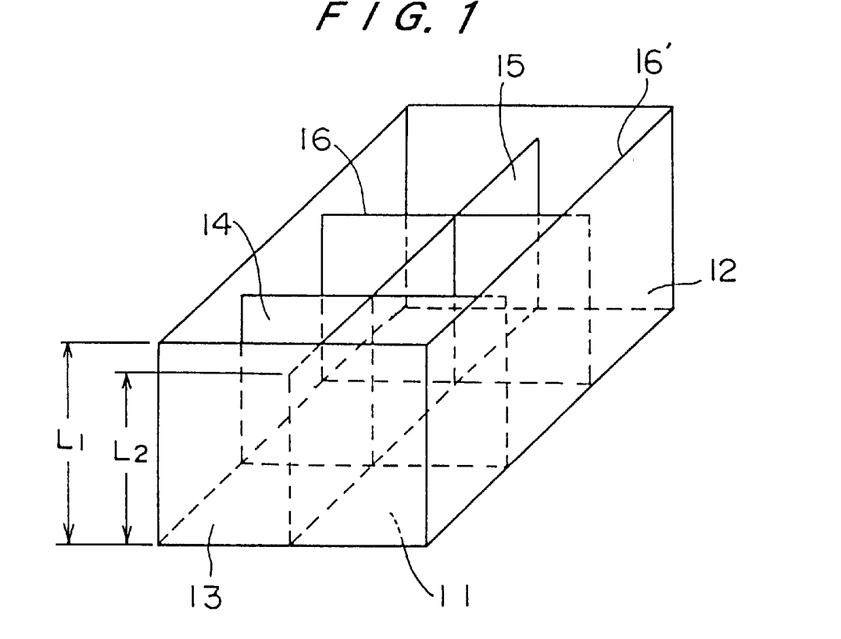
FIG. 1 is a schematic drawing of a first embodiment (PE1) of the impact energy absorptive structures of the present invention.

FIG. 1 is the structure of the impact energy absorptive structures (shortened to IAS hereinbelow) of embodiment 1. The IAS shown in FIG. 1 comprises the rib members having a constant width arranged in a uniform lattice pattern and protruding from a base member. The lattice pattern is designed as a 2×3 lattice configuration. That is, an IAS comprises the lattice including a base member 11, longitudinal side plates (outer rib) 12 and transverse side plates (outer rib) 13 protruding vertically from the base member 11, a middle plate (inner rib) 15 parallel to the side plates 12, and middle plates (inner rib) 14 parallel to the side plates 13. The middle plates 14, 15 are shorter than the side pates 12, 13.

The rib length (height) is denoted as L1 for the side plates 12, 13, and as L2 for the middles plates 14, 15. The rib length L1 and L2 are 60 mm and 55 mm, respectively. This design was adopted so as to absorb impact load in two-stages. The thickness of the rib members is such that the thickness of the tip portion 16 is 0.8 mm, and 1.5 mm at the base member, forming a slight taper from the base member to the tip portion. This is a limitation necessarily imposed by the need to remove the IAS from the mold used in injection molding process for manufacturing the IAS. The inter-cell spacing is 35 mm.

The material for manufacturing of the IAS was in a form of pellets comprising the ethylene-propylene block copolymer containing 28% by weight of ethylene-propylene copolymer portion which has ethylene content of 40% by weight. The melt index (MI) of the pellets is 15 g/10 min. The proportion of the cross sectional area of the long rib members is 0.59 of the total cross sectional area of the rib members of the IAS.

The ethylene content was determined according to the IR spectrum method described in "Polymers Handbook" pp. 256 to 257, (ii) "Block Copolymers" published by Asakura Publishing, 1985.

The following Table 1 shows the results of impact strength tests carried out on the samples made in embodiments samples (PE) 1 to 5 compared with a comparison sample (CM) 1.

Impact strength tests were conducted by using Instrumented multiaxial impact loading tester (Dart Drop Graphic Impact Tester, Model A, Toyo Seiki Co. Ltd.). The load was measured with a load cell, and the dart tip was modified to a disk loader having 120 mm in diameter and 10 mm in thickness). The load of 6.4 Kg was dropped from a height of 1.5 m, producing an initial impact velocity of 5.4 m/s.

TABLE 1

| Sample No. | Av. Load | Ini. Peak Value | Max. Def. Load |
|---|---|---|---|
| PE1 | 4400 | 4600 | 4700 |
| CM1 | 4600 | 7400 | 4900 |
| PE2 | 3500 | 4000 | 3500 |
| PE3 | 3200 | 3100 | 3500 |
| PE4 | 4200 | 4500 | 6600 |
| PE5 | 4000 | 3100 | 6400 |

Notes: PE (preferred embodiment); CM (comparison) Av. Load (average load) Ini. Peak Value (initial peak value); Max. Def. Load (load at maximum deformation). All values in newtons.

In Table 1, the average load refers to an average of the readings taken with the load cell, and the initial peak value refers to a peak load reading during the initial impact loading stage. Load at maximum deformation refers to a load reading, which was registered by the load cell, at the time of maximum deformation.

In PE1 (FIG. 1), the process of impact energy absorption begins at the tip portion 16' of the side plates 12, 13 receiving the first impact loading. In this condition, the tip portions 16 of the middle plates 14, 15 have not yet made contact with the loading surface. Therefore, only the side plates 12, 13 receive the load. The cross sectional area of said rib members 12, 13 resisting the deformation is small, and plastic deformation occurs quickly to absorb the initial peak of impact load to provide quick protection to human body.

Figure 2:
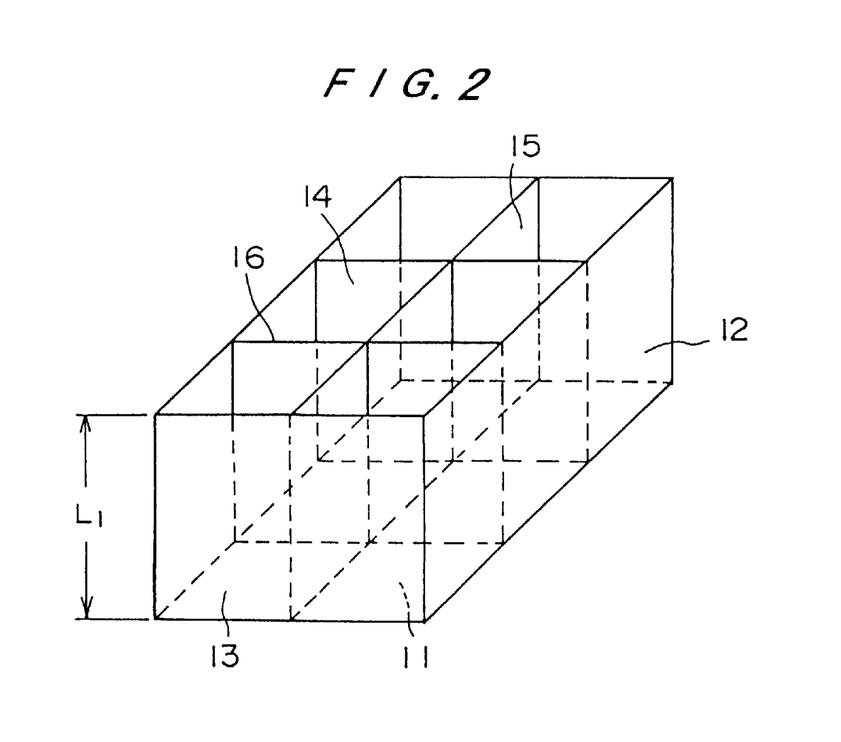
FIG. 2 is a schematic drawing of a first comparison example (CM1) of the impact energy absorptive structures.

FIG. 2 is the structures of CM1. The structures of CM1 is such that for the base member 11 there are side plates 12, 13, middle plates 14, 15 but the dimension of their lengths (heights) is uniformly 60 mm. Other dimensions of CM1 are the same as those for PE1, as are the material and manufacturing method. The result in Table 1 shows that CM1 exhibited a higher initial peak of impact load under identical testing conditions.

Figure 3:
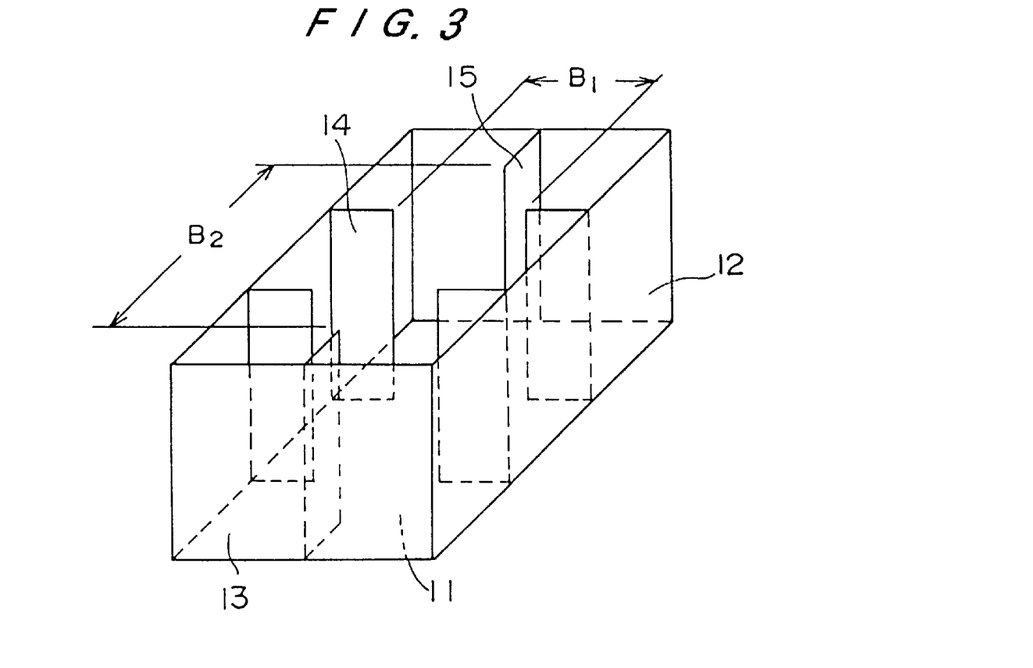
FIG. 3 is a schematic drawing of a second embodiment (PE2) of the impact energy absorptive structures of the present invention.

FIG. 3 shows the IAS of PE2. This IAS has the rib members of 0.8 mm thickness distributed uniformly in a lattice pattern, and a cut-out section (or vacant region) is provided by removing intersections lattice points formed by the middle plates 14, 15 shown in FIG. 1. The vacant region is defined by the dimensions B1 for the regions of the middle plate 14 and B2 for the regions of the middle plate 15. The structures also comprises a base member 11, side plates 12, 13, the latter two are the same as those shown in FIG. 1. The cross sectional area of the rib members are designed to absorb the energy of the anticipated impact load. The material and the method of manufacturing of the IAS is the same as those in PE1.

An advantage of PE2 is that the thickness of the rib members and the spacing of the lattice can be adjusted to suit the anticipated impact loading. The thickness of the rib members has a certain lower limit for convenience of the manufacturing process. Impact loading is received by the base member 11, so the rib spacing or the lattice spacing cannot be made too large and certain spacing is required. By removing portions defined by B1 and B2 in the middle plates 14 and 15 to reduce the cross sectional area, it becomes possible to provide a resisting area to adjust the resisting strength of the IAS to suit the magnitude of the anticipated impact loading. By providing the vacant region, intersections of lattice points of the middle plates 14, 15 are removed and the result is a reduction in the initial peak of impact load.

The results of testing PE2, carried out under the same conditions as for PE1, shown in Table 1, indicate that the average load decreased, consistent with decreased cross sectional area of the IAS, and its initial peak of impact load also decreased.

Figure 4:
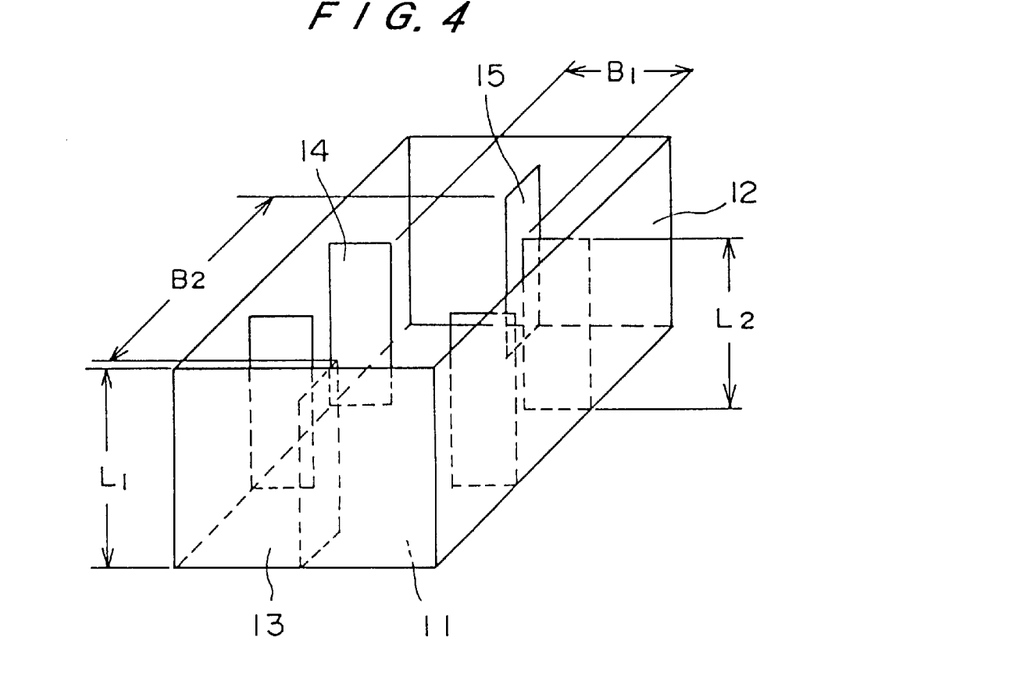
FIG. 4 is a schematic drawing of a third embodiment (PE3) of the impact energy absorptive structures of the present invention.

FIG. 4 shows the IAS of PE3. This IAS has the same vacant-centers, B1 and B2 as in PE2, and the lengths (heights) L2 of the rib members 14, 15 are made shorter as in PE2. The side plates 12, 13 are the same as in PE1 and PE2.

The results of testing PE3, carried out under the same conditions as for PE1, shown in Table 1, indicate that the average load decreased, consistent with the decreased cross sectional area of the IAS, and the initial peak of impact load is equal to the average load value. The properties of the IAS of PE3 is as if a mixture of the IASs of PE1 and PE2.

Figure 5:
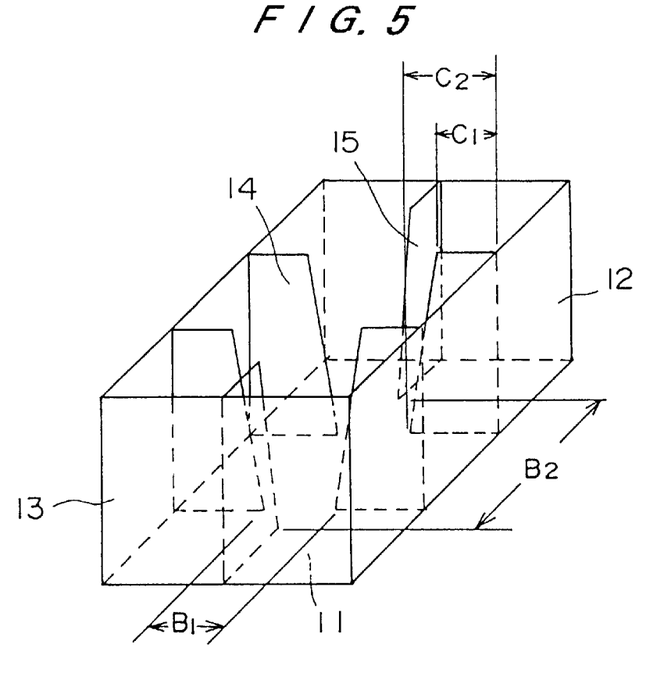
FIG. 5 is a schematic drawing of a fourth embodiment (PE4) of the impact energy absorptive structures of the present invention.

FIG. 5 shows the IAS of PE4. This IAS has a latticed-configuration of side plates 12, 13 as in PE1 and has a vacant center such that the rib members of 0.8 mm in thickness at the tip portion protruding from the base member 11 are uniformly arranged. The shape of the rib members is such that the width C1 at the tip portion is narrower than the width C2 at the base member. The material and the manufacturing method are the same as in PE1.

The cross sectional area of the rib members is designed so as to absorb impact loading gradually increased. The shape is suitable to increasing resistance of the rib members as the deformation progresses, which represents a desirable impact absorbing behavior of the IAS. The vacant-regions B1, B2 of the middle plates 14, 15 and the changing dimensions from C1 to C2 combine to produce a desirable impact absorbing behavior. The results of testing PE4, under the same conditions as in other samples, reported in Table 1, demonstrate that the initial peak of impact load is reduced while offering high energy absorption.

Figure 6:
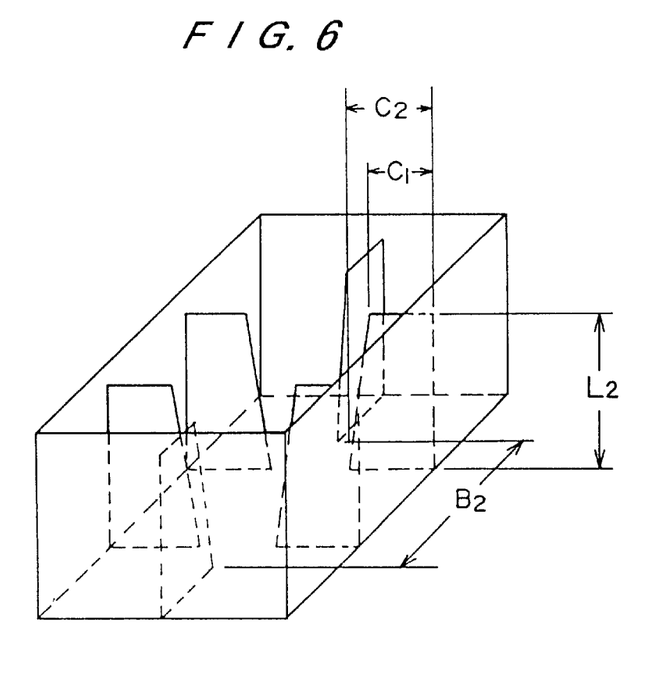
FIG. 6 is a schematic drawing of a fifth embodiment (PE5) of the impact energy absorptive structures of the present invention.

FIG. 6 shows the IAS of PE5. This IAS has a latticed-configuration of side plates 12, 13 as in PE1 and has a vacant center such that the rib members of 0.8 mm in thickness at the tip portion protruding from the base member 11 are uniformly arranged. The shape of the rib members is such that the width C1 at the tip portion is narrower than the width C2 at the base member. The rib lengths (heights) L2 of the middle plates 14, 15 is made short as in PE1. The material and the manufacturing method are the same as in PE1.

The cross sectional area of the rib members is designed to offer increasing resistance to deformation as the impact loading is applied and the structures collapse. By providing the vacant regions B1, B2 and making the middle rib members 14, 15 short, initial peak of impact load is reduced. By increasing the rib width gradually from C1 to C2 and thereby increasing the cross sectional area, a desirable pattern of impact resistance can be obtained.

Table 1 presents the results of testing PE5 under the same conditions of testing for all others.

Next, a second series of testing IASs having a second basic configuration shown in FIGS. 7 to 8 will be explained with specific reference to PE6, PE7 and PE8. The difference between the first and second series IASs is that in the second series IASs have a rib length (height) of 80 mm, the thickness of tip portion of 0.6 mm and a lattice configuration of 2×2. The facts that the thickness of the tip portion of the rib members is smaller than that at the base member, that an expanding tapered shape of the rib members is towards the base member, other dimensions, material and the manufacturing methods are the same as in the first series.

Figure 7:
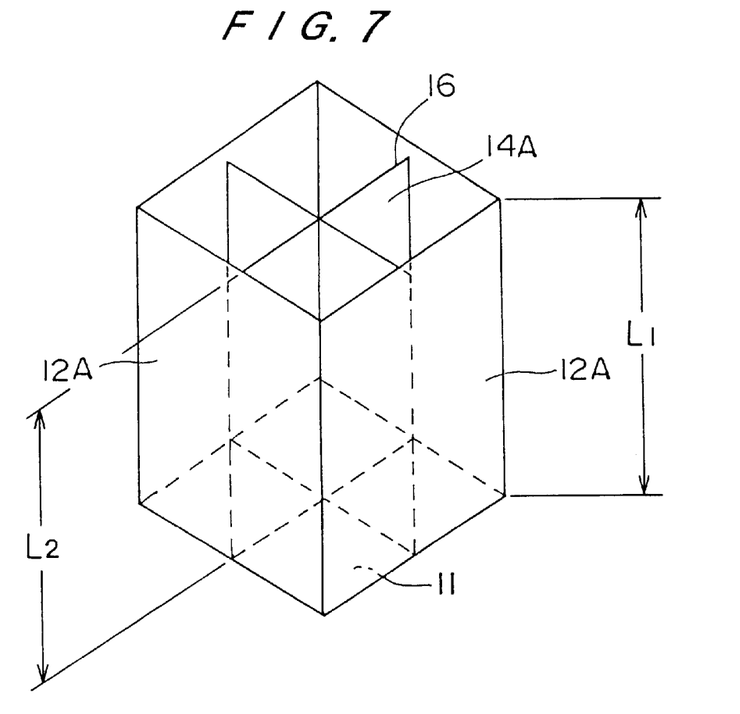
FIG. 7 is a schematic drawing of a sixth embodiment (PE6) of the impact energy absorptive structures of the present invention.

FIG. 7 shows a structure of the IAS of PE6. The IAS of PE6 has side plates (outer rib) 12A of length (height) L1, middle plates (inner ribs) 14A of length (height) L2 where L1>L2. The proportion of the cross sectional area of the long rib members is 0.3 of the total cross sectional area of the rib members which corresponds to PE1 in the first series, and the effects of the rib members in offering resistance to deformation are the same as PE1.

Table 2 shows the results of impact testing of IASs of second series. The testing apparatus was basically the same as that used in testing the first series, but the impact loading was higher. The load of 20.0 Kg was dropped from a height of 1.0 m, producing an initial impact velocity of 4.5 m/s. This series is made to be applicable where the impact energy overall is higher than that in the first series, and the corresponding maximum deformation was 40 mm compared with 20 mm in the first series.

TABLE 2

| Sample No. | Av. Load | Ini. Peak Value | Max. Def. Load |
|---|---|---|---|
| PE6 | 2300 | 2400 | 3500 |
| CM2 | 2600 | 4300 | 3500 |
| PE7 | 1600 | 1500 | 1700 |
| PE8 | 1700 | 1600 | 2000 |

Notes: PE (preferred embodiment); CM (comparison) Av. Load (average load) Ini. Peak Value (initial peak value); Max. Def. Load (load at maximum deformation). All values in newtons.

Figure 8:
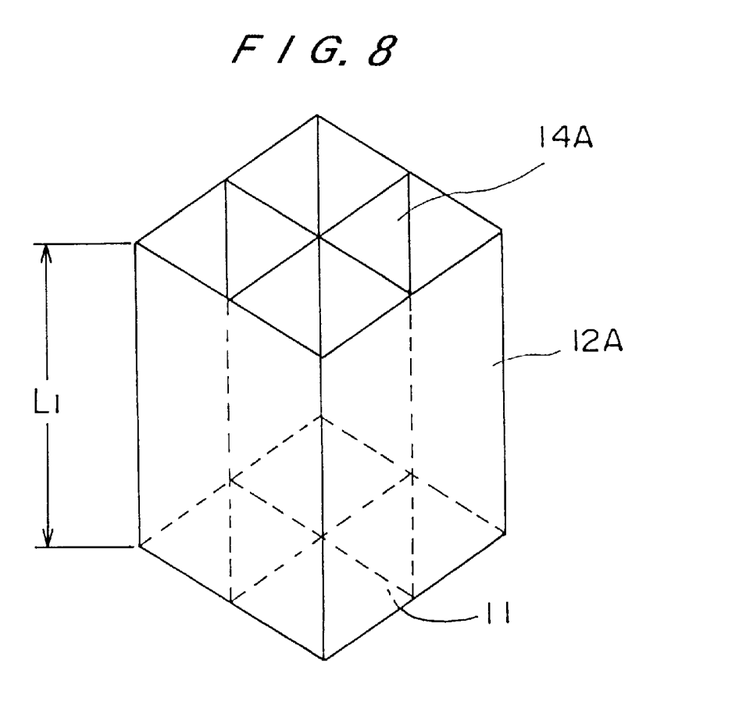
FIG. 8 is a schematic drawing of a second comparison example (CM2) of the impact energy absorptive structures.

FIG. 8 shows the results obtained by CM2 tested under the same conditions as those for PE6, and the comparison is equivalent to CM1 in the first series. In this IAS, the height L1 of all the rib members (side plates 12A and middle plates 14A) is 80 mm. The test results in Table 2 show that CM2, as well as CM1, exhibited a higher initial peak of impact load than the average load. In contrast, the peak of impact load in PE6 is held down low while the value of the load at maximum deformation for both PE6 and CM1 were the same.

Figure 9:
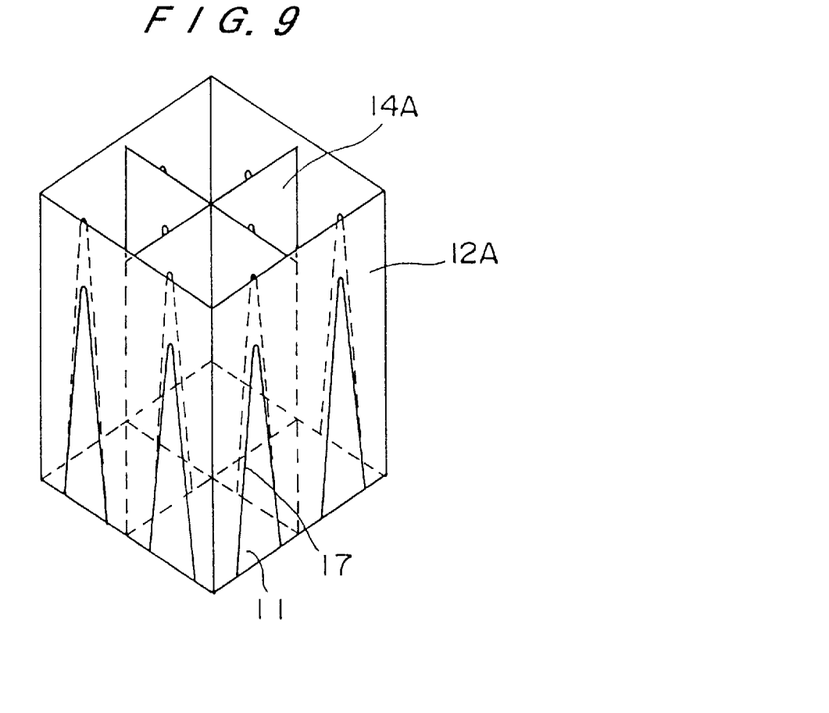
FIG. 9 is a schematic drawing of a seventh embodiment (PE7) of the impact energy absorptive structures of the present invention.

FIG. 9 shows the IAS of PE7. The basic structure of PE7 is the same as that of PE6, thus the thickness of the rib members decreases gradually from the base member 11 towards the tip portion 16. A feature which has been added to PE7 is that a cut-out section (vacant space) 17 has been added such that the width of the cut-out section 17 increases gradually from the tip portion 16 to the base member 11 as seen in FIG. 9. The dimensions of the cut-out section 17 is determined so that an increase in the cross sectional area caused by the increasing thicknesses of the rib members 12A, 14A is compensated by having the cut-out section 17, thus maintaining approximately a constant cross sectional area of the rib members in the direction of impact loading.

The above-noted structure of PE7 presents an advantage that the load does not increase during the deformation process of the rib members caused by an impact loading. This is thought to be the result of approximately constant cross sectional area presented along the direction of impact loading, and therefore the load required for collapsing of the rib members does not increase noticeably.

The results of testing PE7 under the same test conditions as PE6 and CM2 are presented in Table 2. For PE7, the average load is lower which is consistent with the decrease in the cross sectional area, and the initial peak of impact load is further reduced in comparison to PE6. The load at maximum deformation for PE7 is lowered further in comparison with PE6 and CM2. This is because the cross sectional area of the regions close to the base member 11 does not increase as the deformation process is continued, consequently the collapsing strength is maintained constant throughout the impact loading process.

Figure 10:
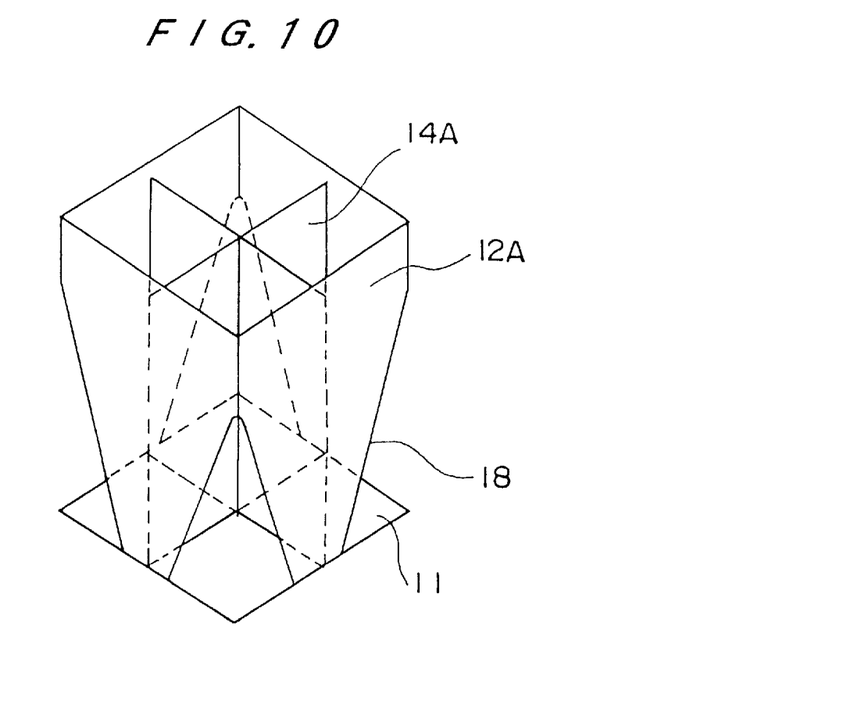
FIG. 10 is a schematic drawing of an eighth embodiment (PE8) of the impact energy absorptive structures of the present invention.

FIG. 10 shows the IAS of PE8. Similar to the design of PE7, this structure is also provided with a cut-out section 18 on rib members 12A so that the width of the cut-out section 18 increases towards the base member 11 to control the variation of the cross sectional area in the deformation process. The cut-out 18 is not provided on the interior of rib members but only on the rib members 12A which constitute the wall section of the IAS of PE8. This is a choice made so as to facilitate manufacturing, by inserting a core of a shape to correspond with the shape of the cut-out 18 into an injection mold.

The cut-out 18 provided only on the outer walls performs an equivalent function as the cut-out 17 which is provided on all of the rib members, therefore, the size of cut-out 18 is made to be comparatively large.

The results of testing PE8 under the same test conditions as PE6 are reported in Table 2. For PE8, the average load is lower which is consistent with the decrease in the cross sectional area, and the initial peak of impact load is between that of PE6 and PE7. It is thus noted that the performance of PE8 is somewhere between those of PE6 and PE7.

Figure 11:
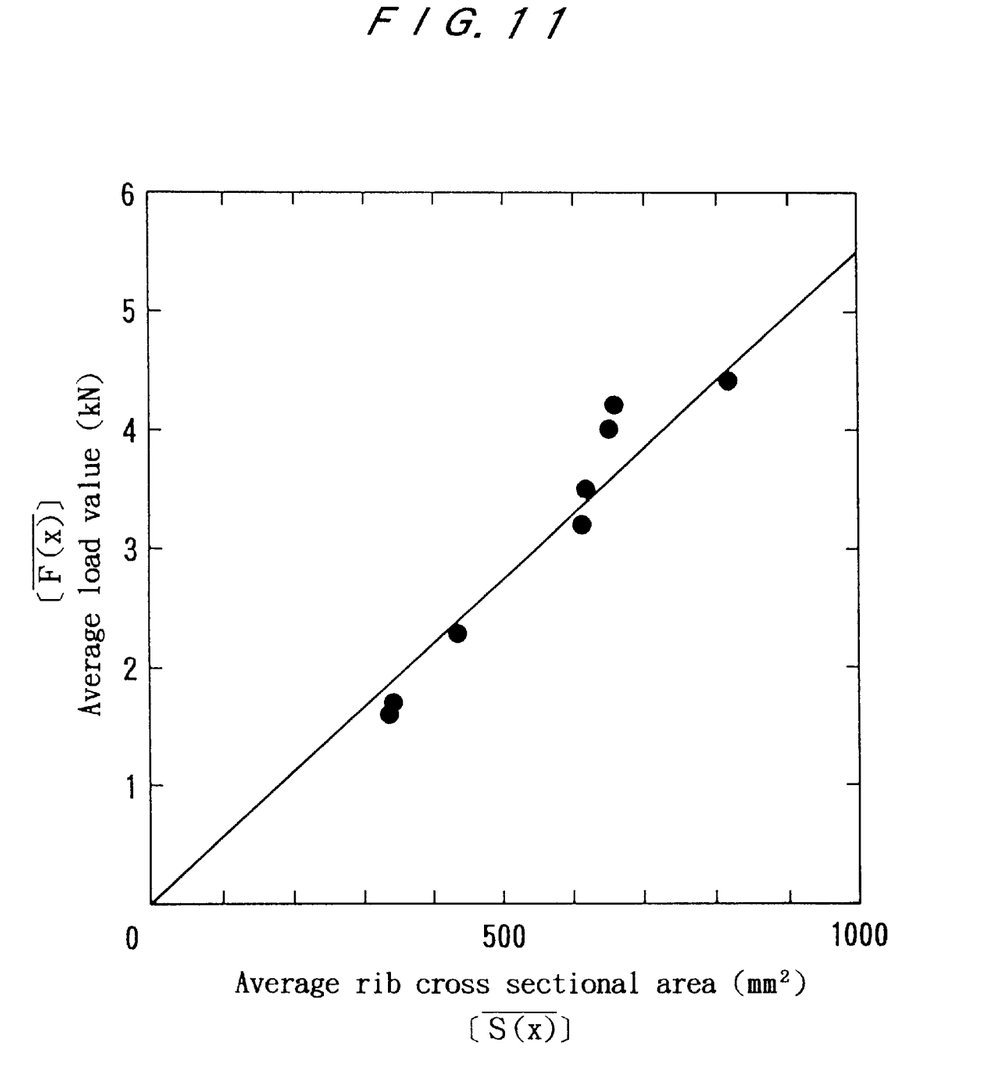
FIG. 11 is a graph showing the results of impact absorbing tests for the impact energy absorptive structures of the present invention.

FIG. 11 is a graph which summarizes the results of impact testing of preferred embodiments PE1 to PE8. Here, the average cross sectional area of the rib members ($\overline{S(x)}$) is an average of the cross sectional area ($S(x)$) of the rib members as a function of the displacement ($x$) along the direction orthogonal to the base member. The average load ($\overline{F(x)}$) is an average value of the load ($F(x)$) detected by the load cell as a function of the displacement ($x$). According to this graph, it can be seen that the correspondence between $\overline{S(x)}$ and $\overline{F(x)}$ during impact testing is excellent. Therefore, by using these results, it is possible to calculate an average cross sectional area to correspond to a certain impact load, and to present suitable impact resisting structures to suit an application. Further, the rib members collapse with time, therefore, the displacement (x) is also a function of time. Therefore, the cross sectional area under load and the load change with time (t). FIG. 11 shows that cross sectional area (S(t)) and the load (F(t)) also exhibit a correlation. In other words, by controlling the time-dependent cross sectional area of the rib members which collapse under load, it is possible to obtain a pattern for the time-dependent impact resistance strength (F(t)).

For instance, an example of the impact energy absorptive structures is a requirement for a constant impact resistance pattern for F(t), in which case, it is possible to design the rib members so that S(t) becomes constant over the time period of application of an impact loading.

The conceptual framework of the present invention has thus been demonstrated that an impact loading can be absorbed in a multi-stage collapsing mode in which the impact energy absorbed by the rib member can be varied during the collapsing of the impact energy absorptive structures so as to present a customized absorption to suit an application. The concept was illustrated with reference to preferred embodiments and specific examples, but other designs and combinations are obviously possible. For example, the concept illustrated in FIGS. 3 to 6 can be applied to combinations represented by embodiments shown in FIGS. 7, 9 and 10 to generate a suitable IAS of optimum performance.

Further, the above embodiments were based on uniformly spaced rib members of square shape in a lattice configuration. However, the rib members need not be restricted to square shaped lattice configuration, and other shapes such as a triangle or a hexagonal shape can be utilized equally effectively.

It should be obvious that the numerical values for the sizes and the shapes pertaining to these IASs should be chosen in association with their structure, end use and manufacturing methods. The method of manufacturing need not be limited to injection molding, and compression molding may be used equally effectively.

In all the preceding embodiments, the rib members protrude from a flat base member and the contact region on the rib members is also flat, but it is obvious that both the base member and the contact region can assume curved shapes to suit end use applications.

What is claimed is:

1. An impact energy absorptive structure comprising:
    a base; and
    a plurality of impact energy absorbing ribs protruding from said base in a direction of impact loading, said ribs being arranged in an intersecting lattice configuration,
    wherein said ribs comprise at least two long ribs and at least two short ribs, each long rib having substantially the same length as any other long rib and each short rib having substantially the same length as any other short rib,
    and wherein a proportion of a total cross sectional area of said long ribs is in a range between 0.3 to 0.8 of a total cross sectional area of all ribs at a plane orthogonally intersecting the impact loading direction.

2. An impact energy absorptive structure comprising:
    a base; and
    a plurality of impact energy absorbing long ribs and short ribs protruding from said base in a direction of impact loading, said ribs having a constant width and said ribs arranged in a uniform pattern;
    the ribs containing cut-out sections produced by removing intersections of lattice points formed by said ribs so that a cross sectional area of said ribs provides collapsing strength during impact loading.

3. An impact energy absorptive structure as claimed in claim 2, wherein said cut-out section is formed in accordance with a design on a plane parallel to a direction of impact loading.

4. An impact energy absorptive structure comprising:
    a base and
    a plurality of deformable impact energy absorbing ribs protruding from said base, said ribs being geometrically intersecting to define lattice structures,
    said ribs having a cut-out section.

5. An impact energy absorptive structure as claimed in claim 4, wherein said cut-out section is formed in accordance with a design on a plane parallel to a direction of impact loading.

6. An impact energy absorptive structure as claimed in claim 5, wherein said cut-out section is at an intersection of at least a portion of said lattice structures.

7. An impact energy absorptive structure as claimed in claim 4, wherein said cut-out section is formed in a direction of impact loading.

8. An impact energy absorptive structure as claimed in claim 4, wherein said cut-out section has a cross sectional area which varies in a designed pattern along a direction of impact loading.

9. An impact energy absorptive structure as claimed in claim 8, wherein for said designed pattern the cross sectional area of the intersecting ribs increases from a tip portion of said ribs towards the base.

10. An impact energy absorptive structure as claimed in claim 9, wherein said ribs have an increasing width from said tip portion towards said base.

11. An impact energy absorptive structure as claimed in claim 8, wherein said designed pattern is a constant cross sectional area in a direction of impact loading.

12. A long and short-ribbed impact energy absorber comprising:
    a base; and
    a plurality of impact energy absorbing ribs protruding from said base in a direction of impact loading, said ribs being arranged in an intersecting lattice configuration,
    wherein said ribs comprise at least one long rib and at least one short rib, each long rib having substantially the same length as any other long rib and each short rib having substantially the same length as any other short rib,
    and said long ribs having a total cross sectional area in a range between 0.3 to 0.8 of a total cross sectional area of all ribs at a plane orthogonally intersecting impact loading direction.

13. An absorber according to claim 12, wherein the ribs have a constant width.

14. An absorber according to claim 12, wherein the ribs are in a uniform pattern.

15. A cut-out containing impact energy absorber comprising:
    (A) a base; and
    (B) a plurality of impact energy absorbing ribs protruding from said base in a direction of impact loading,
    wherein said ribs comprise at least one long rib and at least one short rib, each long rib having substantially the same length as any other long rib and each short rib having substantially the same length as any other short rib, and said long ribs having a total cross sectional area in a range between 0.3 to 0.8 of a total cross sectional area of all ribs at a plane orthogonally intersecting impact loading direction, and the ribs having a cut-out section, wherein the cut-out section is produced by removing intersections of lattice points formed by the ribs.

16. An absorber according to claim 12, wherein the ribs have a cross sectional area that varies in a designed pattern along impact loading direction.

17. An absorber according to claim 12, wherein the ribs have a cross sectional area that increases from a tip portion of the ribs towards the base.

18. An absorber according to claim 12, wherein the ribs have an increasing width from the rib tip portions to the base.

19. An absorber according to claim 12, wherein the ribs have a constant cross sectional area in an impact loading direction.

20. An absorber according to claim 14, wherein the ribs have a decreasing thickness from the base towards a tip portion of the ribs, and wherein the cut-out section has an increasing width from the tip portion of the ribs towards the base.

21. An absorber according to claim 12, wherein the ribs have an increasing width from a tip portion of the ribs towards the base.

22. An absorber according to claim 12, comprising a thermoplastic resin.

23. An absorber according to claim 22, wherein the thermoplastic resin is a polypropylene resin.

24. An absorber according to claim 22, wherein the thermoplastic resin comprises:

(A) 80 to 100% by weight of an ethylene-propylene block copolymer containing 10 to 30% by weight of an ethylene-propylene copolymer having an ethylene content of 20 to 60% by weight, and (B) 20 to 0% by weight of a copolymer rubber selected from the group consisting of an ethylene-propylene copolymer rubber and an ethylene-butene-1 copolymer rubber.

25. An absorber according to claim 24, wherein the resin has a melt index of 5–50 g/10 min.

26. An absorber according to claim 25, wherein the resin has a melt index of 10–35 g/10min.

27. An impact energy absorptive structure comprising:

a base; and a plurality of rib members formed to protrude from said base member for absorbing impact energy by deformation, wherein a cut-out section is provided to a designed location of said rib members to extend in a direction of impact loading, wherein said rib members are arranged to extend in at least two directions parallel to a surface of said base, said directions intersecting each other.

28. An impact energy absorptive structure comprising:

a base; and a plurality of impact energy absorbing ribs protruding from said base in a direction of impact loading, said base and said ribs being integrally formed from a resin through a molding process in a mold, said ribs having a patterned variation of a cross sectional area along the direction of impact loading and a variation of a cross sectional area of said impact energy absorptive structures for removability from said mold so that a cross sectional area of said ribs provides collapsing strength during impact loading, wherein said ribs are arranged in an intersecting lattice configuration, and wherein each rib (i) has a decreasing thickness in a direction from the base towards a tip portion of said ribs and (ii) has a cut-out section of increasing width in a direction from said tip portion of said ribs towards said base.

* * * * *